United States Patent [19]

Barge

[11] Patent Number: 5,571,368
[45] Date of Patent: Nov. 5, 1996

[54] LAMINATING MACHINE WITH IMPROVED HEATING AND COOLING

[75] Inventor: Eric W. Barge, Honeoye Falls, N.Y.

[73] Assignee: Graphic Laminating, Inc., Solon, Ohio

[21] Appl. No.: 228,407

[22] Filed: Apr. 15, 1994

[51] Int. Cl.$^6$ ............... B32B 31/04; B30B 15/34
[52] U.S. Cl. ............ 156/359; 156/498; 156/499; 156/555; 156/583.1; 100/93 RP; 219/469; 219/539; 219/540
[58] Field of Search ............... 156/498, 499, 156/555, 583.1, 583.5, 359; 165/89, 90, 168, 177, 179, 183, 88, 182, 184; 219/201, 538, 539, 540, 552, 469; 100/93 RP; 425/368

[56] References Cited

U.S. PATENT DOCUMENTS

| | | | |
|---|---|---|---|
| 1,361,970 | 12/1920 | Dickey | 156/311 |
| 2,224,370 | 12/1940 | Wescott | 156/498 X |
| 2,554,150 | 5/1951 | Moore | 156/85 |
| 2,895,508 | 7/1959 | Drake | 165/183 X |
| 2,984,030 | 5/1961 | Hannon | 283/94 |
| 3,143,454 | 8/1964 | Hannon | 156/499 |
| 3,309,983 | 3/1967 | Dresser | 156/555 X |
| 3,408,242 | 10/1968 | Rochla | 156/274 |
| 3,413,171 | 11/1968 | Hannon | 156/277 |
| 3,417,497 | 12/1968 | Hannon | 283/108 |
| 3,421,960 | 1/1969 | Arbit | 156/244 |
| 3,450,585 | 6/1969 | Takagi et al. | 156/242 |
| 3,453,169 | 7/1969 | Buck et al. | 156/555 X |
| 3,823,047 | 7/1974 | Colombo | 156/555 X |
| 4,154,296 | 5/1979 | Fijas | 165/183 X |
| 4,268,345 | 5/1981 | Semchuck | 156/499 |
| 4,351,689 | 9/1982 | Elliott et al. | 156/378 |
| 4,423,106 | 12/1983 | Mahn | 428/207 |
| 4,484,971 | 11/1984 | Wang | 156/244.14 |
| 4,494,648 | 1/1985 | Held | 156/583.5 X |
| 4,721,502 | 1/1988 | Herrington | 493/193 |
| 4,923,560 | 5/1990 | Inselmann | 156/555 |
| 5,073,221 | 12/1991 | Waitts et al. | 156/253 |
| 5,098,514 | 3/1992 | Held | 156/583.1 |
| 5,188,691 | 2/1993 | Caputo | 156/145 |
| 5,232,538 | 8/1993 | Liu | 156/359 |
| 5,282,915 | 2/1994 | Westlake, Jr. | 156/243 |

*Primary Examiner*—James Sells
*Attorney, Agent, or Firm*—Watts, Hoffmann, Fisher & Heinke Co., L.P.A.

[57] ABSTRACT

An improved laminating machine having a supply of laminating material guided into the machine so a pair of webs respectively are fed through heating stations and then extend parallel to one another along a workpiece path in a direction towards a drive station. A supply of sheet material is delivered between the webs of laminating material. A pair of pressing rolls supported for rotation engage and bond together opposite sides of the heated laminating material and the sheet material to form a composite workpiece. Each heating station directs laminating material to the pressing rolls. Each heating station is formed in an arcuate configuration and includes a plurality of rollers and a plurality of heaters. Each heater is operatively connected with a respective roller. A pair of rotatable cooling rollers are supported along the path between the pressing rolls and the drive station. Each cooling roller has at least one coolant passage extending longitudinally therethrough. A fluid coolant flow is supplied through the passage in each cooling roller. The cooling rollers are located to engage opposite sides of a heated composite workpiece to cool the composite workpiece.

18 Claims, 5 Drawing Sheets

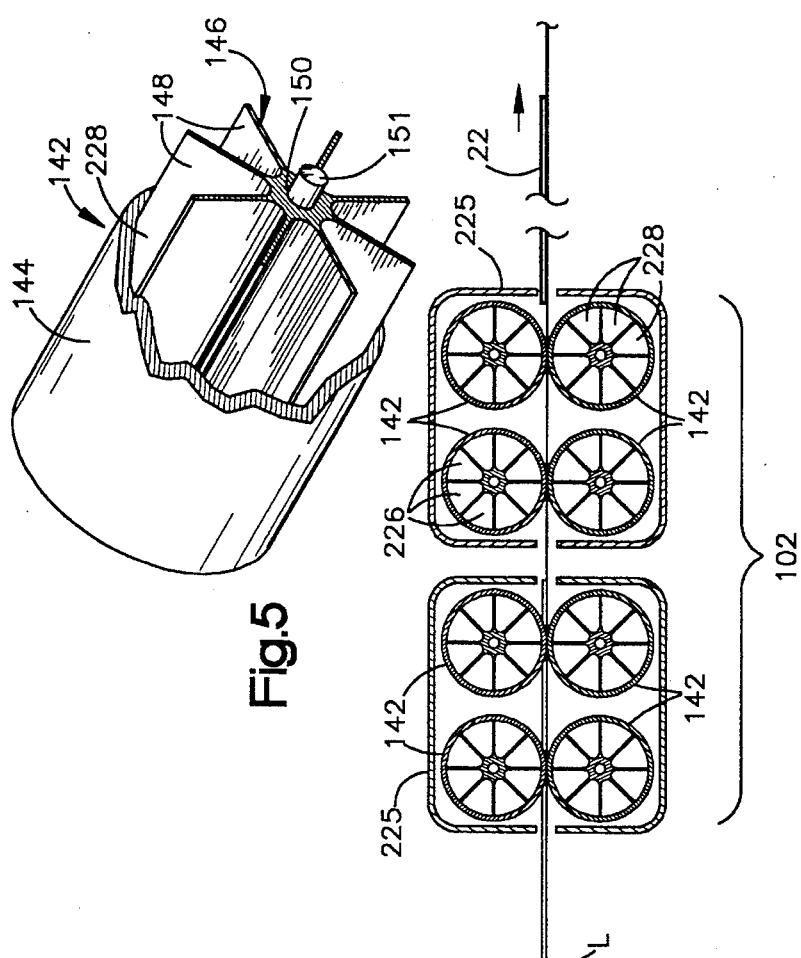
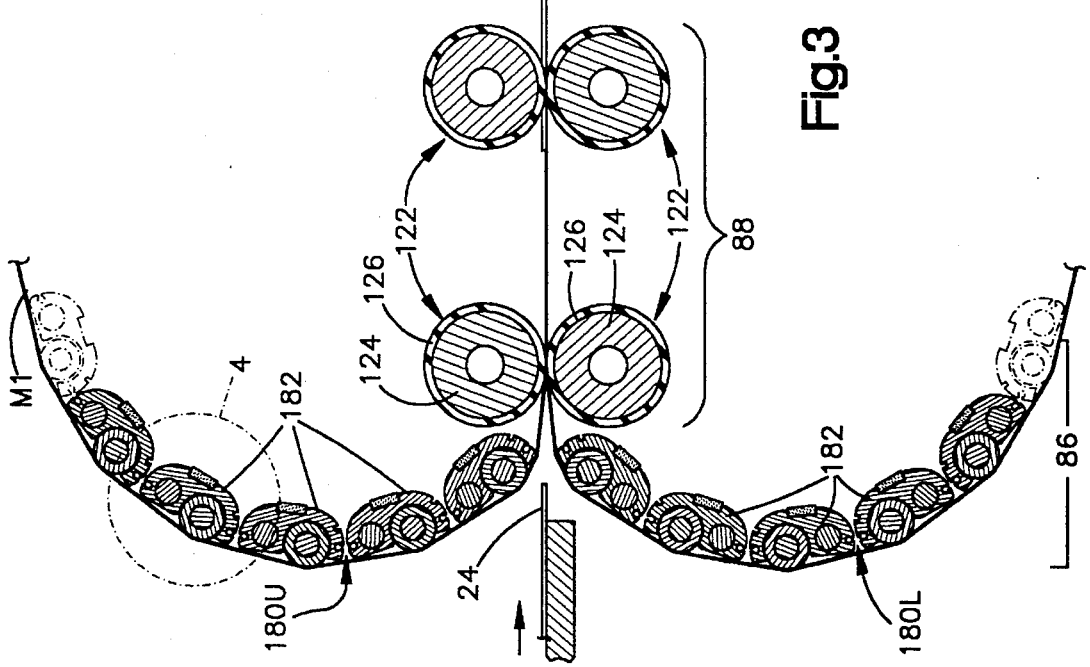
Fig.5
Fig.3

5,571,368

LAMINATING MACHINE WITH IMPROVED HEATING AND COOLING

BACKGROUND OF THE INVENTION

1. Technical Field

The present invention relates generally to a laminating machine for applying protective coverings to relatively large items and in particular to improvements in laminating machine heating and cooling stations.

2. Description of the Prior Art

Known laminating machines are used to laminate protective coverings of relatively thin and narrow plastic material on relatively small paper or other core items, such as for driver's licenses and identification cards. Similarly, laminating machines are also used for laminating protective coverings over relatively larger items, such as menus and maps which often include an 8½ inch by 11 inch, or larger, paper or cardboard core material supplied continuously or in individual sheets.

Prior machines for applying protective lamination to cores have typically, if not exclusively, had one of three types of heating arrangements to heat soften a bonding layer of the protective material. These are (i) stationary shoe heaters over which plastic strips are fed in sliding contact, such as shown in U.S. Pat. No. 3,413,171 to Hannon and entitled Process of Making Identification Cards, issued Nov. 26, 1968; (ii) spaced shoe heaters designed to transfer heat to a strip of film as it is fed around a feed roll, such as that shown in U.S. Pat. No. 3,143,454 to Harmon and entitled Laminating Press, issued Aug. 4, 1964; or, (iii) heater rolls around which a plastic web was fed. All of these have exhibited drawbacks. All were relatively inefficient limiting the throughput of a laminating machine to relatively low volumes. Usually, if not always, they lacked adequate controls to maintain consistent operational temperatures and an ability to quickly bring a machine to an equilibrium condition. As a consequence, control over such a machine to produce consistent and uniform finished product was accomplished by operator observation of products coming through the machine and adjusting the feed rate of the machine to produce uniform products.

These described drawbacks, while often attributable to relatively inefficient and relatively unstable film heating systems, were exacerbated by the failure to provide efficient cooling systems to cool laminations quickly and effectively to "freeze" the thermoplastic material functioning as a bonding agent to apply a protective covering to a core. When ambient conditions were hot so cooling was excessively slowed, an operator had to manually adjust the feed rate of the machine to slow it and lower the temperature of the heaters to appropriate levels for the slower feed rates.

SUMMARY OF THE INVENTION

The laminating machine of the present invention overcomes disadvantages associated with prior laminating machines for applying protective coverings to a core. The laminating machine of the present invention provides an apparatus with a new and improved heating station and a new and improved cooling station. Because of improved efficiency and consistency for applying protective coverings the improved heating and cooling stations enable a relatively large size and high quality laminated item to be produced at greatly increased production speeds and at lower cost with minimal scrap. In addition, due to simplicity, the improved machine is far less costly than any prior machine which approaches the production capabilities of the improved machine.

The laminating machine of the present invention provides a supply of laminating material to be fed along a path of travel through the machine. Where both faces of workpieces are to receive protective coverings, a pair of webs of the laminating material extend in a parallel facing relationship through heating, pressing and cooling stations to a drive station. Sheet material is delivered between the webs of laminating material after they have been heated in the heating stations.

At the pressing station, at least one pair of pressing rolls are supported for rotation to engage and bond together opposite sides of the heated laminating material webs to themselves and to the sheet material between the webs to form a laminated composite. The laminated composite is then fed between cooling rolls at the cooling station.

The improved heating station has a pair of heater assemblies respectively located along independent paths of web laminating material travel. Each heater assembly is located between an associated supply of laminating material and the pressing station.

Each heater assembly includes spaced sets of supports which are carried by frame members of the laminating machine. The supports mount a set of heater sub-assemblies. Each sub-assembly includes a guide roller, a heater and a heat transfer body. The heater sub-assemblies are arranged in an arcuate array with each sub-assembly having a heat transfer roller positioned such that the rollers together delineate a path of web travel through the heating station, where a thermoplastic adhesive layer of the web is heat softened by successive serial contact with each of the rollers.

Each sub-assembly has an elongated aluminum extrusion which forms the heat transfer body. Each extrusion includes an elongate recess which is a segment of a circle in cross section. An associated roller is positioned in each recess with a small section of its cylindrical surface projecting from the heat transfer body recess. Each roller section is in engagement over a small section of its cylindrical surface with a workpiece when the machine is in use. Each body also has an elongate bore in which an elongate heater is positioned to heat the body and in turn the associated roller. Each sub-assembly includes a heat sensor connected to its body and controllably connected to its heater to maintain stable and substantially uniform heat conditions in its sub-assembly.

The sub-assembly heat transfer bodies are positioned to be in substantial juxtaposition with side portions of each body projecting in opposed directions from its roller recess. The side portions are closely spaced from the web path of travel. When the machine is in use, the closely juxtaposed heat transfer body side portions, coact to trap pockets of air between adjacent rollers and between the web and the bodies, such that the trapped air becomes heated and assists in warming the workpiece.

Each roller is in closely spaced relationship with the walls of its recess. While each roller and its associated body are not in contact, the quantity of air trapped between them is so small that heat transfer between the body and the roller approaches the efficiencies of heat conduction.

While transparent plastics are virtually as transparent to radiant heat energy as they are to light, some small amount of supplemental heating of a workpiece is achieved through heat energy radiating from the bodies in their closely spaced relationship with the workpiece path of travel.

The cooling station includes a pair of heat conductive cooling rollers supported for rotation between the pressing and drive stations. Each of the cooling rollers has at least one longitudinally extending through passage. Fluid coolant flow is supplied through the passage in each of the cooling rollers and also around the rollers. The cooling rollers are positioned to engage opposite sides of the laminated composite to cool the composite. Heat transferred to each cooling roller from engagement with the laminated composites is dissipated and carried away by the fluid coolant flowing around the roller and through its passage.

Each of the cooling rollers includes a tubular outer portion for engaging the workpiece and an inner support portion having a plurality of radially extending reinforcing and heat transfer ribs to support the tubular outer portion. The inner and outer portions of each cooling roller are made from an aluminum alloy material to maximize heat transfer from the heated laminated composite workpiece to the coolant fluid flow. The coolant fitlid flow may be provided by a fan and a shroud which conducts ambient air adjacent the machine through and around the cooling rollers.

The coolant fluid flow may also be supplied by an air conditioner in fluid communication with the cooling rollers to force temperature controlled air around and through the cooling rollers. A sensor for monitoring the temperature of the fluid coolant flow in the cooling rollers may be provided. A control operatively connected to such sensor may also be provided for adjusting the temperature of the coolant fitlid flow to maintain the temperature of the cooling rollers at a predetermined temperature.

Accordingly an object of the invention is to provide an improved laminating machine and method of applying protective laminations.

BRIEF DESCRIPTION OF THE DRAWINGS

Further features of the present invention will become apparent to those skilled in the art to which the present invention relates from reading the following specification with reference to the accompanying drawings, in which:

FIG. 3 is an enlarged schematic view of heating and cooling stations of the laminating machine in FIG. 2;

FIG. 5 is an enlarged perspective view, with parts broken away and removed, of a portion of a cooling roller of the cooling station in FIG. 3;

DESCRIPTION OF PREFERRED EMBODIMENTS

Figure 1:
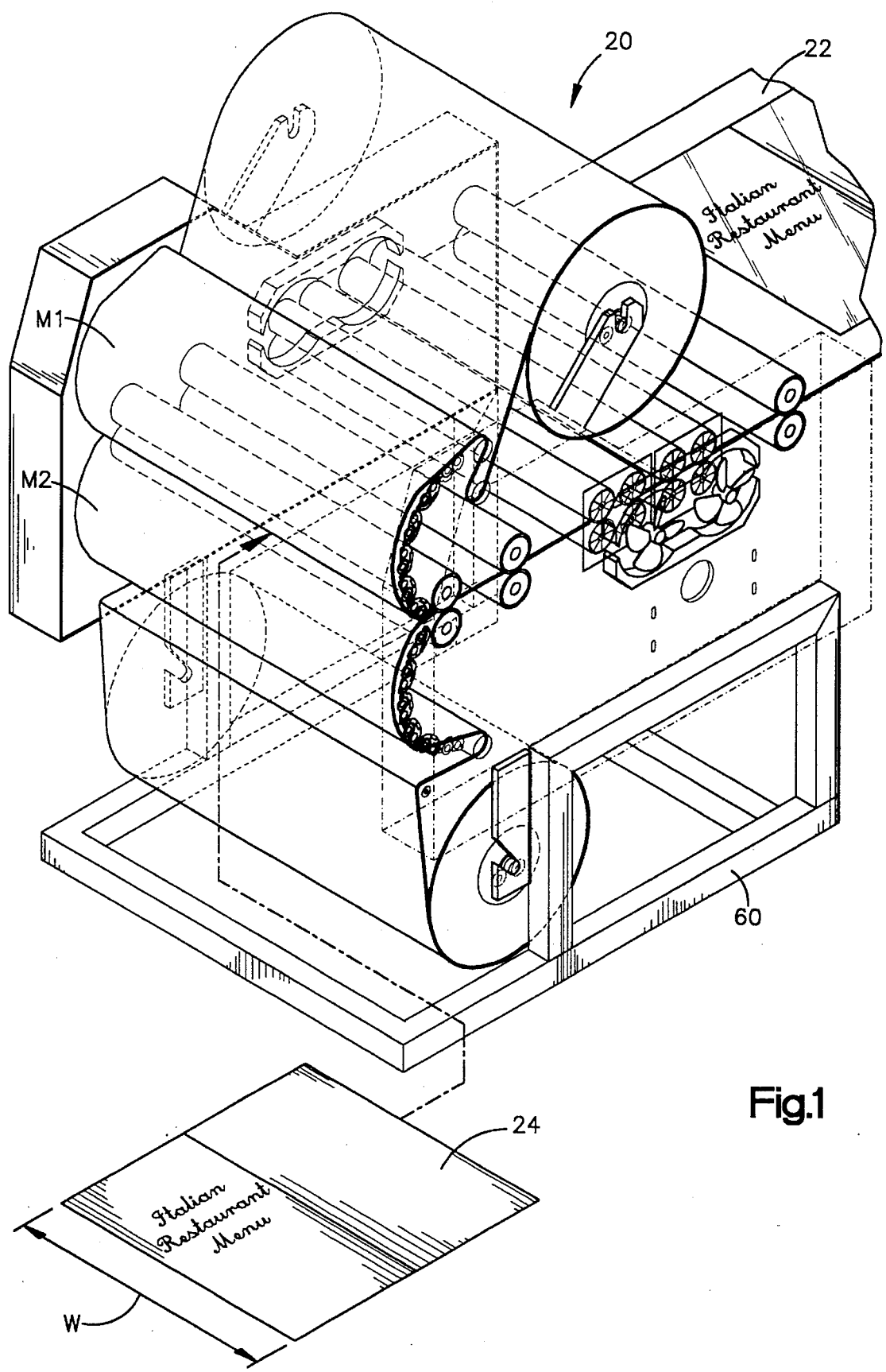
FIG. 1 is a perspective view, with hidden parts illustrated by dashed lines of a laminating machine embodying the present invention.

A laminating machine 20, embodying the present invention for use in producing a relatively large finished laminated composite item 22, is illustrated in FIG. 1. A prototype of the laminating machine 20 is sized to accommodate input items 24 having a width W of no more than thirty inches. Thus, webs of laminating material M1, M2 and input items 24 to be laminated up to thirty inches wide may be used in the prototype of the laminating machine 20 of the present invention.

This relatively large size laminated, composite, finished item 22 is believed to be the largest size that can be manipulated comfortably by a person for application of protective coverings. Thus, relatively large input items 24, such as paper or cardboard maps and menus, can easily be laminated at a relatively fast production rate to produce excellent quality products. Also, relatively large and relatively continuous input items such as a cardboard or paper sign used for special events or other purposes can be protected and strengthened by laminating, especially if the finished product is to be located in a relatively harsh environments such as wind, rain and/or snow.

The laminating machine 20 has an associated input station 42 (FIG. 2) where a relatively large and wide input item 24 can be introduced into the laminating machine. The input station 42 is located at a front end F of the machine 20 and can be integral with the laminating machine 20 or can be a stand alone device. An output station 46 is associated with the laminating machine 20 and located at a rear end R of the laminating machine. The output station 46 also can be integral with the laminating machine 20 or be a stand alone device. The output station 46 can take the form of a roll up station or a cutting and stacking station for handling the laminated composite finished item 22.

The laminating machine 20 includes upper and lower material supply supports 62, 64 fixed to a base frame 60. The upper support 62 is for mounting and supporting a roll 66 of laminating web material MI. The roll 66 rotates relative to the support 62 as the laminating web material M1 is drawn into the laminating machine 20. A roll 68 of the laminating web material M2 is mounted and supported in the lower support 64 for rotation as the laminating web material M2 is drawn through the laminating machine 20. The laminating web material M1, M2 may be any suitable sheet laminating material that protects, adheres and bonds to itself and to an input item 24, such as a sheet of polyester film with a layer of polyethylene bonded to it to function as a thermoplastic adhesive.

Each of the laminating web materials M1, M2 is of a width and thickness appropriate for the particular input item 24 to be laminated. The webs of laminating material M1, M2 are trained about or through operative parts delineating a path of travel through the laminating machine 20. Tensioning rollers 82 idler rollers 84 and heating stations 86 are parts which delineate arms of the path for the webs M1, M2. Pressing and cooling stations 88, 102 and a drive station 104 delineate the remainder of the path through which one or both webs M1, M2 and the items 24 are fed.

Input items 24 to be laminated are introduced into the path between trains of laminating web material M1, M2 at the input station 42 which is located along the path between the heating station 86 and the pressing station 88. After being fed through the pressing and cooling stations, resultant cooled and laminated composite finished items 22 are directed from the drive station to the output station 46.

The drive station 104 includes at least a pair of drive rollers 162 supported for rotation and driven by a drive system 164 at an appropriate and adjusted speed. Each drive roller 162 includes a central metallic support portion 166 and an outer rubberized surface 168 to frictionally drive a workpiece L therethrough during rotation of the drive rollers 162.

The tensioning rollers 82 are supported by the frame 60 for movement relative to the frame in a direction substantially tangent to respective supply rolls 66, 68 as indicated by arrows 110. The tensioning rollers 82 are biased in a direction away from the respective supply rolls 66, 68. The tensioning rollers 82 maintain a substantially constant tension in the webs of laminating material M1, M2 as they are drawn into the laminating machine 20. The idler rollers 84 are supported for rotation by the frame 60 and direct the laminating web material M1, M2 to a respective heating station 86.

Each heating station 86 redirects and guides a respective web of laminating material M1, M2 into the pressing station 88 as they are drawn towards the drive station 104 and the output station 46. The heating station 86 elevates the temperature of the adhesive layer of each web of laminating material M1, M2 to a core or item adhesion temperature so that it may be easily formed around and bonded to the input item 24 and, if present, to the other web of laminating material.

As illustrated in FIG. 3, the heating station 86 includes a pair of heat shoe assemblies 180U, 180L. Each heat shoe assembly 180U, 180L includes a plurality of substantially identical heaters sub-assemblies 182. In the example illustrated in FIGS. 1–3, five heater sub-assemblies 182 form a respective one of the pair of heat shoe assemblies 180U or 180L. Alternatively, a larger number or a lesser number of heater sub-assemblies 182 may be provided as required to provide optimal heating and guiding of the webs of laminating material M1, M2. The heater sub-assemblies 182 are located and attached to the frame 60 in an array to form a generally arcuate shaped heat shoe assembly 180U, 180L.

Figure 4:
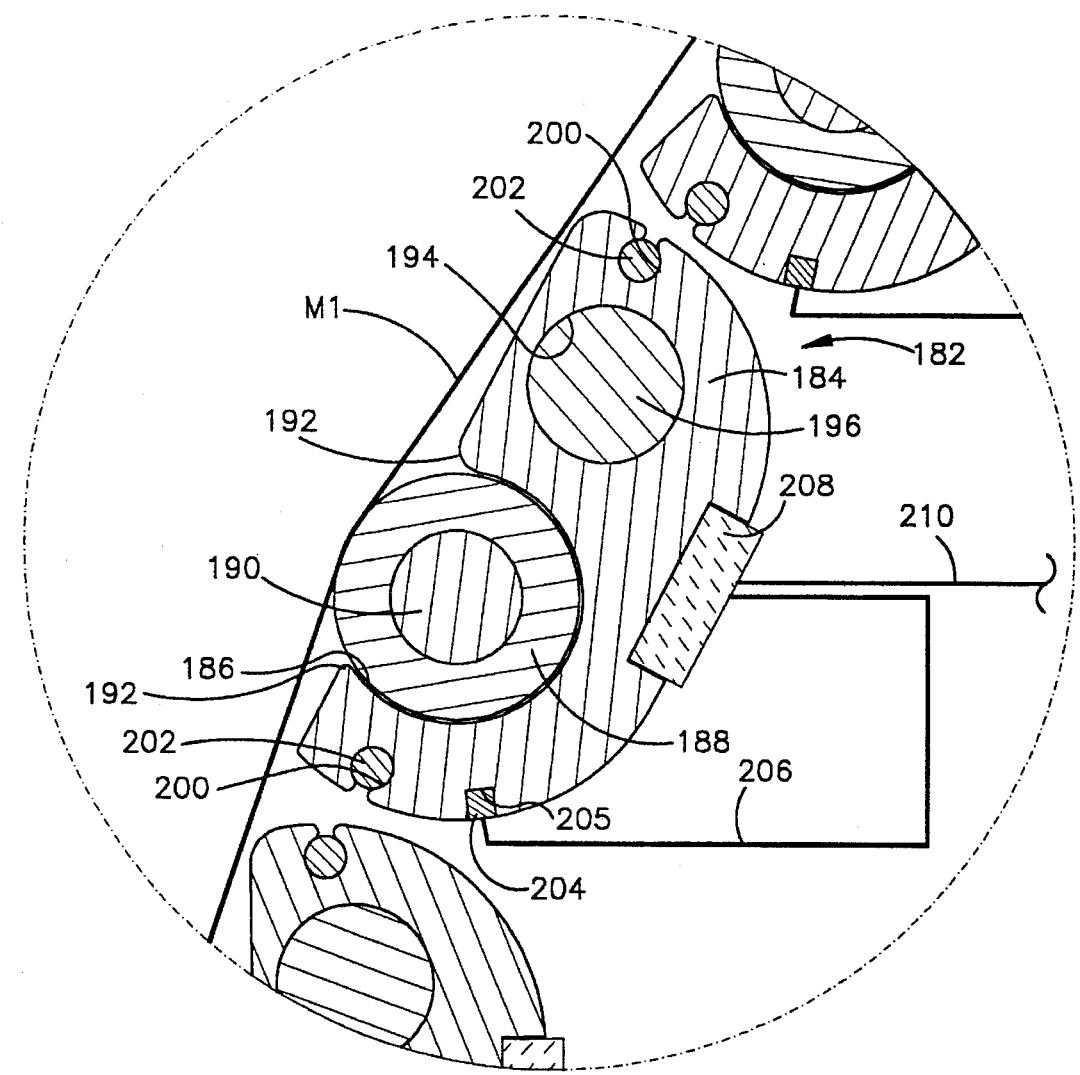
FIG. 4 is an enlarged cross-sectional view of one of the plurality of heating element sub-assemblies of the heating station in FIG. 3.

As best shown in FIG. 4, each heater sub-assembly 182 includes a heat transfer body in the form of a support member 184. The body is a one-piece extrusion of a suitable high heat transfer metal, preferably an aluminum alloy. The body 184 includes an elongate recess 186 of generally C shaped configuration. The recess is, in cross section, a segment of a circle. A heat transfer roller 188 is positioned in the recess 186 in concentric relationship. The roller includes a shaft 190 having ends journaled in the frame 60 for free rotation. The roller 188 is in close juxtaposition and concentric with the recess 186, so that heat is transferred from tile body 184 to the roller 188. The rollers 188 together each frictionally engage a web of laminating material M1 over a slight arcuate surface section. The rollers 188 collectively define an arm of the web path of travel and are caused to rotate by engagement of the moving web when the machine is in operation.

Each sub-assembly 182 includes an elongate resistance heater 196 positioned in a bore 194 of the heat transfer body 184. A controller 208 is mounted on the heat transfer body 184 and is controllably connected to the heater 196 to maintain the body and with it its associated roller 188 at appropriate operational temperatures.

Each of the sub-assemblies 182 is supported by a pair of pins 202 which extend through complemental spaced recesses 200 in the heater body and are connected to the frame 60. A thermocouple 204 is mounted in a further heat transfer body recess 205 which is positioned near the associated roller 188. Signals proportional to temperatures sensed by the thermocouple 204 are transmitted to the controller 208 through conduit 206. The controller 208 compares the sensed temperature information from the thermocouple 204 with a heat control signal transmitted from a remote operator input setting through conduit 210 to monitor and control the power supplied to the heater 196.

Figure 2:
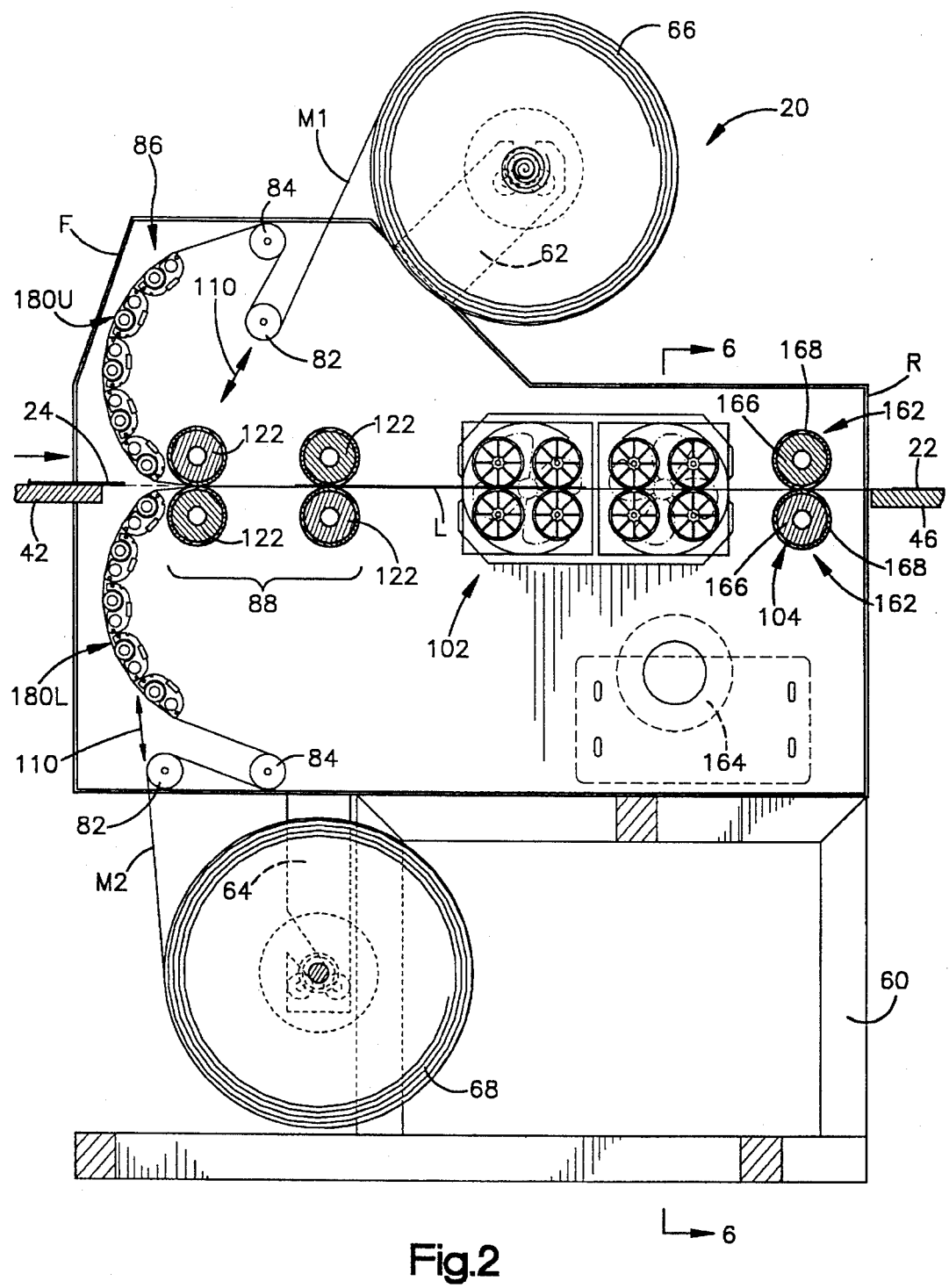
FIG. 2 is a longitudinal, elevational view, partly in section, of the laminating machine in FIG. 1 illustrating operating stations and their relationship.

As an examination of FIGS. 2–4 will show, the sub-assemblies 182 are juxtaposed closely together with the heat bodies 184 close to, but spaced from the path of workpiece travel and the sub-assemblies defining a substantially continuous arcuately curved heater assembly. As heated laminating web materials M1, M2 are guided to the pressing station 88, a desired input item 24, such as a menu, is inserted at the input station 42 between the two parallel extending webs of heated laminating material M1, M2. The movement of the webs of laminating material M1, M2 draws the input item 24 with the webs into the pressing station 88 where they are pressed together to from a composite workpiece L. In some circumstances, only one web of laminating material M2 is required and that web is delivered by the lower roll 68 so input items 24 can be supported on the web as the web travels through the laminating machine 20.

The pressing station 88 (FIGS. 2 and 3) includes two pairs of pressing rollers 122 which are supported for rotation by the frame 60. The pressing rollers 122 are biased or adjustably positioned to cooperate and engage opposite sides of the webs of laminating material M1, M2 to form the workpiece L. Each pair of the pressing rollers 122 exerts a predetermined force on the workpiece L as it passes between the pressing rollers. Each of the pressing rollers 122 includes a support portion 124 preferably made of a metal material and a compressible, relatively thin, rubberized or elastomeric outer covering 126 for engaging and pressing the sides of the workpiece L together. The pressing station 88 forces the webs M1, M2 and the input item 24 together under pressure to form the workpiece L. The pressure of the pressing station 88 bonds the input item 24 and webs M1, M2 together and removes any air pockets or bubbles that may be present in the workpiece L.

Next, the workpiece L is pulled by the drive station 104 (FIG. 2) through the cooling station 102. The cooling station 102 (FIG. 3) includes a cooling bank, preferably comprised of four pairs of cooperating cooling rollers 142 which engage opposite sides of the workpiece L. It will be apparent that more or less than the illustrated four pairs of cooling rollers 142 can be included in the cooling station 102.

Each of the cooling rollers 142 is rotatably supported by the frame 60 and has cooling fluid flowing therethrough in order to maintain the cooling roller at a temperature lower than the temperature of the workpiece L. The cooling rollers 142 cooperate and engage either side of the heated workpiece L and remove heat from the workpiece by conduction. Thus, it is very important to maintain the temperature of the cooling roller 142 below the temperature of the workpiece L. It will be apparent that as the workpiece L travels through the cooling station 102 the temperature of the workpiece in the direction of movement will decrease as a subsequent pair of cooling rollers 142 are engaged.

Each of the cooling rollers 142 is made up of a two-piece construction. An outer cylindrical portion 144 (FIG. 5) is formed as a seamless aluminum tube. An inner support portion and heat sink 146 is formed as an aluminum extrusion with radially extending heat transfer, support arms or ribs 148 projecting from a central support portion 150. The central support portion 150 receives an end journaled rod 152 to support the cooling roller 142 for rotation. The inner support portion 146 is preferably press fit into the outer cylindrical portion 144 but any suitable attachment procedure and means may be used which provides heat transfer contact and radial support between the arms 148 and the tube 144.

Figure 6:
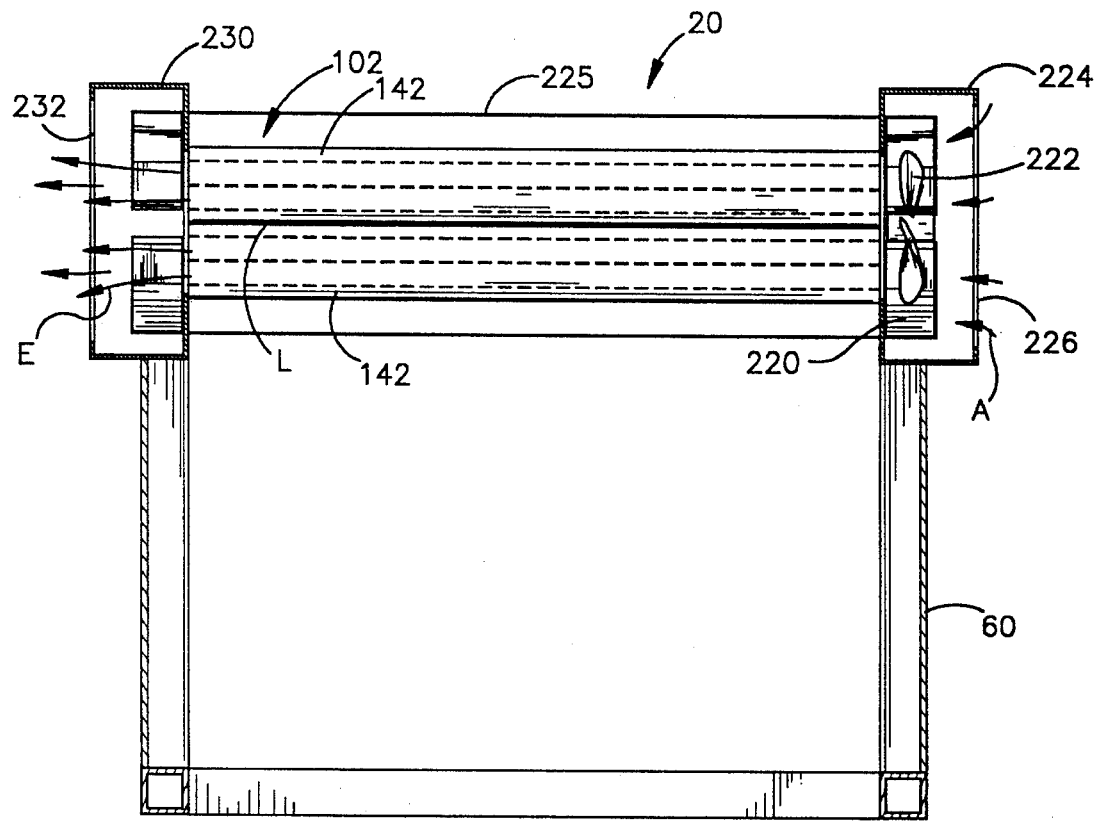
FIG. 6 is an enlarged cross-sectional view of the cooling station of FIG. 2, as seen from the plane indicated by the line 6—6 in FIG. 2.

The embodiment of FIG. 6 is preferred because of simplicity and lower cost. In this embodiment a fan 222 (FIG. 6) is located within a shroud 220 and a cover 224 which is attached to the frame 60. The fan 222 is driven to rotate and circulate ambient air from the exterior of the laminating machine 20. The air, indicated by the arrows A, is drawn into the right cover 224 (as viewed in FIG. 6), through a guard screen 226 located in an opening in the cover, guided by the shroud 220 and then forced through passages 228 (FIG. 5) in the cooling rollers 142. Air is also forced under a cover 225 and around the rollers 142. The passages 228 are defined by the inner surface of the cylindrical tube 144 and the radially extending ribs 148. The circulating air is exhausted from within and around the cooling rollers 142, as indicated by the arrows E, from the other end of the cooling rollers 142 to the left, as viewed in FIG. 6. The exhausted air E is vented to atmosphere through a screen 232 in a left cover 230.

Figure 7:
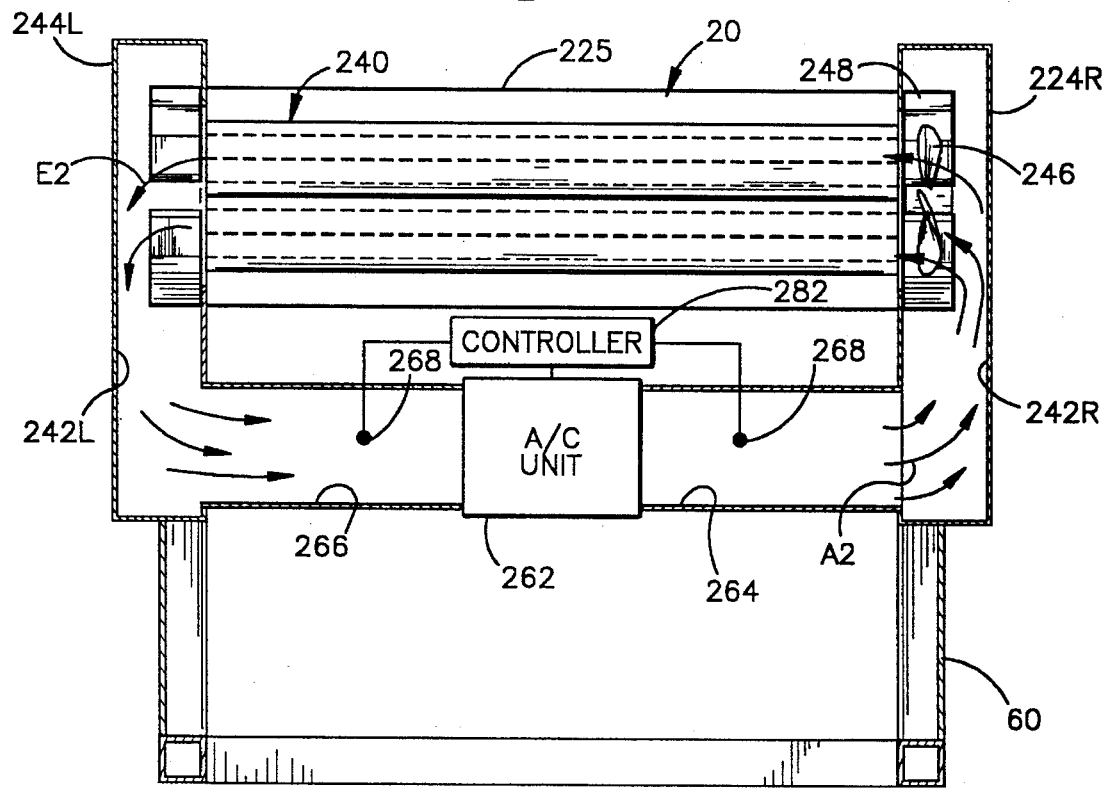
FIG. 7 is a cross-sectional view, similar to FIG. 6, of an alternate embodiment of the cooling station.

An alternative cooling station 240 (FIG. 7) uses an air conditioner to cool and recirculate air around and through tile cooling rollers 142. A plenum chamber 242R, 242L is defined at each end of the cooling rollers 142 by covers 244R, 242L. The plenum chamber 242R, 244L are in fluid communication with the ends of each cooling roller 142 passages 228 therein. An air conditioning unit 262 is located between tile covers 244R, 244L. A cooling passage 264 communicates temperature controlled air A2, from the air conditioning unit 262 to the plenum chamber 242R under pressure by a fan in the air conditioning unit 262 or an optional fan 246 in a shroud 248, or both. The temperature controlled air A2 is then forced through the passages 228 and around the cooling rollers 142. The air E2 exists the left end of each cooling roller 142, as viewed in FIG. 7, in order to recirculate to the air conditioner unit 262 through the left plenum chamber 242 L and passage 266. There, the covers together with the cooling rollers the air conditioner and the passages 264, 266 define a cooling circuit which is completely enclosed to the ambient atmosphere.

An optional temperature sensor 268 can be located in either passage 264, 266 or in both, to monitor the temperature of the air flow going into or exhausted from the cooling rollers 142. A controller 282 monitors the temperature sensed by the sensor 268. The temperature of the cooling air A2 can be maintained at a desired predetermined temperature by setting the controller 282 to control the air conditioning unit 262. Thus, the laminating machine 20 illustrated in FIG. 7 does not depend upon the temperature of the ambient air adjacent the machine. This positive cooling ability contribute to the provision of a consistent and good quality laminated product regardless of the temperature of the air adjacent the laminating machine 20.

Operation

Assuming items 24 are to receive protective coverings on both front and back layers, coiled rolls 66, 68 of protective laminating material M1, M2 are respectively mounted on the supports 62, 64. The material M2, M2 typically used is the now well-known composite having a polyester outer layer, such as the plastic material sold commercially under the trademark Mylar by E. I. DuPont De Nemours and Company, Inc. and a bonding layer of polyethylene. In setup the webs of material M1 and M2 are respectively fed around the tensioning rollers 82, over the idler rollers 84, past the heating station 86, through the pressing station 88, the cooling station 102, the drive station 104 and to the output station 46. The heaters 196 are then energized to bring the heater sub-assemblies 182 to operating temperature and cooling fans 222 are turned on. The drive station 104 is then energized to feed the webs M1, M2 through the laminating machine 20.

Input items 24 are fed from the input station serially. They become intimately bonded to the outer polyester layers by the respective polyethylene layers which have been brought to core item adherence condition by transfer of heat from the heat rollers 188 through the polyester. It will be recognized that the polyester, which is substantially in thermoplastic, is unaffected by its passage through the heating stations.

The two webs of laminating material M1, M2 and input items 24 are brought together as they arc fed between the pairs of pressing rollers 122 at the pressing station 88, where the polyethylene is brought into smooth surface adhesion with the front and back of the items and any trapped gases are expelled. Thereafter, the laminated composite L passes through the cooling station 102 where the polyethylene is cooled and "frozen" to produce a desired finished product.

During setup it will normally be necessary for the operator to adjust remote controls, not shown, to produce consistent and desired finished products. To that end the power supplied to the heater assemblies, the speed of rotation of the drive station 104 and, where available, the condition of coolant in the cooling station 102 are adjusted until an equilibrium is reached. Once an equilibrium is reached, the machine will continue to produce consistent finished products over long periods of time without further operator adjustment of such parameters as speed of the machine throughput and temperature of the heating stations.

From the above description of preferred embodiments of the invention, those skilled in the art will perceive improvments, changes and modifications. Such improvements, changes and modifications within the skill of the art are intended to be covered by the appended claims.

Having described at least one preferred embodiment of the invention, what is claimed is:

1. An apparatus for heating a material, said apparatus comprising:
    a) a plurality of sub-assemblies each including:
        i) a roller for contacting such material;
        ii) a heater;
        iii) a heater control connected to the heater; and,
        iv) heat transmission means for operatively connecting said heater with its roller to heat the roller and thereby heat such material during roller contact, said transmission means comprising a heat transfer bar having walls defining a roller recess, the roller being substantially within its recess, the bar also including a chamber for mounting the heater to conduct heat from said heater to said roller when the apparatus is in use; and,
    b) the sub-assemblies being arranged in a curved array.

2. The apparatus in claim 1 wherein each bar is an extruded aluminum alloy member.

3. The apparatus in claim 1 wherein said sub-assemblies are positioned in an arcuate array.

4. In a laminating machine for adhering plastic covers to either one or both faces of core sheets, a heat station assembly comprising:
    a) a plurality of individual heater sub-assemblies;
    b) each sub-assembly comprising:
        i) a heat transfer roller having a cylindrical surface for contact with and heating of a plastic material to a core adhesion condition;

ii) an elongate heat transfer body having walls defining an elongate recess of an arcuate cross sectional configuration;

iii) the roller being disposed substantially within and substantially surrounded by the recess, the walls and the surface being in closely spaced, concentric relationship;

iv) a heater connected to the body in heat transfer relationship;

v) a heater control connected to the heater; and, vi) means to mount the sub-assembly to a support structure; and, c) wherein the support structure supports each of the sub-assemblies to form a curved heating array with the rollers positioned to delineate a portion of a plastic material path of travel and sequentially transfer heat to such plastic material to bring it to such core adhesion condition.

5. The sub-assembly of claim 4 wherein the heat transfer bodies are in substantial abutment when supported in said array.

6. The sub-assembly of claim 4 wherein the rollers delineate an arcuate portion of said path of travel.

7. The sub-assembly of claim 4 wherein each of said heat transfer bodies has a heater bore and each heater is positioned in the bore.

8. The sub-assembly of claim 4 wherein each heat transfer body projects oppositely from its associated roller with projecting body portions being adjacent to but spaced from the film path.

9. A machine for laminating protective coverings sheet material, comprising:

a) a supply station for supporting a supply of laminating material;

b) a heating station for contact with a portion of a web of such laminating material, and directing such laminating material towards a laminating station comprising:
i) a plurality of heater sub-assemblies;
ii) each sub-assembly comprising:
aa) a heat transfer roller having a cylindrical surface for contact with and heating said laminating material to a core adhesion condition;
bb) an elongate heat transfer body having walls defining an elongate recess of an arcuate cross sectional configuration;
cc) the roller being disposed substantially within and substantially surrounded by the recess, the walls and the surface being in closely spaced, concentric relationship;
dd) a heater connected to the body in heat transfer relationship; and,
ee) a heater control connected to the heater; and, c) structure supporting the sub-assemblies in a heating array with the rollers positioned to delineate a portion of a curved material path of travel and sequentially transfer heat to such laminating material to bring it to such core adhesion condition;

d) a pair of coactable pressing rolls delineating the laminating station, the pressing rolls being supported for rotation and positioned to engage heated laminating material to bond the laminating material together with such sheet material and form a workpiece;

e) a pair of cooling rollers supported for rotation along a path of workpiece travel from the laminating station to the drive station, the cooling rollers including through fluid passages; and, f) said cooling rollers engaging opposite sides of such workpieces to cool such workpieces when the machine is in use and carry away heat which was removed by engagement with the workpiece.

10. The machine of claim 9 wherein each of the rollers includes a tubular outer portion and an inner portion having a plurality of reinforcing heat transfer ribs to support, strengthen and cool said outer portion.

11. The machine of claim 9 wherein each of said fluid passages extends longitudinally through the length of its cooling roller.

12. The machine of claim 9 wherein each of said cooling rollers comprises a tubular outer portion for engaging the laminate and an inner portion having a plurality of radially extending reinforcing heat transfer ribs to support said outer portion in a radial direction and transfer heat from the outer portion to fluid in its associated fluid passage.

13. The machine of claim 9 including an air conditioner in fluid communication with said passages for circulating temperature controlled air through said cooling rollers to maintain the temperature of said cooling rollers lower than the temperature of the workpiece.

14. The machine of claim 13 further including means for monitoring the temperature of the air circulating through said cooling rollers and for adjusting the temperature of the circulating air to maintain the temperature of the cooling rollers substantially at a relatively constant temperature.

15. The machine of claim 9 further including a fan and a shroud for conducting ambient air adjacent the machine through each of said cooling roller passages to maintain the temperature of said cooling rollers lower than the temperature of the workpiece.

16. The machine of claim 9 further including a second laminating material and a second heating station including a second heater assembly for contact with such second laminating material for heating and directing such second laminating material towards the laminating station.

17. The apparatus of claim 10 wherein said plurality of reinforcing ribs are disposed in a radial array and extend from a central mounting portion to an inner surface of said outer portion to support said outer portion, adjacent pairs of said plurality of reinforcing ribs at least partially define a passage for fluid flow.

18. The apparatus of claim 9 further including another pair of rollers which cooperate to engage opposite sides of the workpiece and which in combination with the first mentioned pair of rollers define a cooling bank.

* * * * *